United States Patent [19]

Tangonan et al.

[11] 4,403,825

[45] Sep. 13, 1983

[54] INTEGRATED OPTICS THIN FILM DEVICES AND FABRICATION THEREOF

[75] Inventors: Gregory L. Tangonan, Oxnard; David L. Persechini, Santa Monica, both of Calif.

[73] Assignee: Hughes Aircraft Company, El Segundo, Calif.

[21] Appl. No.: 206,797

[22] Filed: Nov. 14, 1980

Related U.S. Application Data

[63] Continuation-in-part of Ser. No. 961,354, Nov. 16, 1978, abandoned.

[51] Int. Cl.³ .............................................. G02B 5/174
[52] U.S. Cl. .............................. 350/96.11; 350/96.12
[58] Field of Search ............... 350/96.11, 96.12, 96.13, 350/96.14, 96.15, 96.18

[56] References Cited

U.S. PATENT DOCUMENTS

3,917,384  11/1975  Harper et al. .................... 350/96.18

OTHER PUBLICATIONS

Sov. J. Quantum Electron., vol. 8, No. 5, May 1978, Andriesh et al., "Photodetector Elements and Relief--Type . . . ", pp. 622-624.
SPIE, vol. 164, Oct. 10-13, 1978, Utrecht, Netherlands, Righini et al., "Signal Processing in Integrated Optics . . . ", pp. 20-26.
Fiber and Integrated Optics, vol. 1, No. 4, 1978, Brandt et al., "Giga-Hertz Modulations Using Bulk Acousto-Optic Interactions . . . ", pp. 417-430.
Applied Physics Letters, vol. 33, No. 6, Sep. 15, 1978, Chen et al., "Diffraction-Limited Geodesic Lens for Integrated Optics Circuits", pp. 511-513.
Optical Engineering, vol. 16, No. 5, Sep./Oct. 1977, Hamilton et al., "An Integrated Optical RF Spectrum Analyzer", pp. 475-478.
J. Appl. Phys., vol. 44, No. 9, Sep. 1973, Ohmachi, "Acousto-Optical Light Diffraction in Thin Films", pp. 3928-3933.
Applied Physics Letters, vol. 28, No. 3, Feb. 1, 1976, Loh et al., "Convolution Using Guided Acousto-Optical Interaction . . . ", pp. 109-111.
IEEE 1978 Ultrasonics Symposium Proceedings, Sep. 25-27, 1978, Cherry Hill, New Jersey, Vahey, "Corrected Waveguide Geodesic Lenses . . . ", pp. 70-73.
Optics Communications, vol. 12, No. 4, Dec. 1974, Zernike, "Luneberg Lens for Optical Waveguide Use", pp. 379-381.
IEEE J. of Quantum Electronics, vol. QE-13, No. 4, Apr. 1977, Anderson et al., "Comparison of Optical-Waveguide Lens Technologies", pp. 275-282.
1977 International Conference on Integrated Optics and Optical . . . , Tokyo, Japan, Jul. 1977, Zembutsu et al., "Photosensitive As-Se-S-Ge Amorphous Films . . . ".
Applied Physics Letters, vol. 31, No. 6, Sep. 15, 1977, Mikami et al., "Phase Tuning in Optical Directional . . . ", pp. 376-378.
1977 International Conference on Integrated Optics and Optical . . . , Tokyo, Japan, Jul. 1977, Mizushima et al., "Photostructural Change of Amorphous . . . ".
1978 Ultrasonics Symposium Proceedings, IEEE, Sep. 1978, Cherry Hill, New Jersey, Barnoski et al., "Design, Fabrication and Integration . . . ".
"The Condensed Chemical Dictionary"-Seventh Edition-Arthur and Elizabeth Rose-4 pages.

*Primary Examiner*—John D. Lee
*Assistant Examiner*—Frank González
*Attorney, Agent, or Firm*—J. Dennis Moore; David W. Collins; Anthony W. Karambelas

[57] ABSTRACT

There is disclosed a class of integrated optics devices comprising a variety of optical elements such as waveguides, lenses, couplers and the like, and a method of fabrication thereof. In particular, there is disclosed an aberration-free geodesic lens for integrated optics devices. In these devices, photo-induced refractive index changes in chalcogenide glass films may be used to fabricate a radial index of refraction distribution profile in order to form a lens. By varying the exposure of the thin film to ultra-violet light, variable index of refraction profiles may be formed. The variable profile may itself form the lens or, preferably, a thin film may be deposited on an aspherical geodesic lens in order to provide correction of focal length, thus reducing the mechanical tolerances required in the grinding process. These devices thus permit a degree of freedom heretofore unobtained in thin film optical waveguides for use in such devices as a spectrum analyzer operating at the 0.9 to 1.0 micrometer region of the infrared. An important advantage of this approach is that it is compatible with the use of high index of refraction materials, which are basic materials for electro-optic and acousto-optic devices.

19 Claims, 6 Drawing Figures

INTEGRATED OPTICS THIN FILM DEVICES AND FABRICATION THEREOF

CROSS-REFERENCE TO RELATED APPLICATION

This application is a continuation-in-part application of Ser. No. 961,354, filed Nov. 16, 1978, now abandoned.

BACKGROUND OF THE INVENTION

1. Field of the Invention

This invention is directed to integrated optics and, more particularly, to aberration-free geodesic lenses for integrated optics devices.

2. Description of the Prior Art

When one attempts to fabricate such devices as an integrated optics spectrum analyzer for infrared operation, there arises the need to form aberration-free lenses on a substrate. Geodesic lenses have in the past been formed by grinding a spherical depression in the substrate. This depression acts as a rough kind of lens, but considerable aberration remains in it. For a full discussion of this problem and of the relevant prior art, reference is made to a paper by M. K. Barnoski et al, entitled "Design, Fabrication and Integration of Components for an Integrated Optic Spectrum Analyzer", published by the IEEE, 1978 Ultra-Sonics Symposium Proceedings held Sept. 25–27, 1978 at Cherry Hill, N.J.

SUMMARY OF THE INVENTION

In accordance with the invention, an integrated optical device which includes an aberration-free optical element is provided. The integrated optical device includes:

(a) a substrate; and (b) a thin film on the substrate, the thin film comprising a chalcogenide glass, at least one region of which has a predetermined varying index of refraction profile to define an optical element. The profile is determined by successively exposing portions of at least one region of the thin film to controlled amounts of radiation to produce corresponding changes in the index of refraction of the glass within the region. The optical element is an aberration-free geodesic lens or coupler.

Also provided is an integrated optic spectrum analyzer comprising:

(a) a substrate;

(b) a waveguiding layer on a surface of the substrate;

(c) means for introducing a beam of optical radiation into the waveguiding layer;

(d) means for collimating the beam;

(e) at least one surface acoustic wave transducer for generating an acoustic wave in the waveguiding layer transverse to the collimated beam to thereby interact with the beam;

(f) means for introducing an RF signal to the surface acoustic wave transducer;

(g) means for focusing the beam subsequent to its interaction with the acoustic wave;

(h) a detector; and (i) means for introducing the focused beam to the detector.

At least one of the collimating and focusing means comprises a geodesic lens as described above, employing a thin film of chalcogenide glass. The lens is formed as described above.

The present invention circumvents much of the critical device fabrication requirements for devices such as an integrated optics spectrum analyzer by resorting to a thin film form of a chalcogenide glass film either to form the lens entirely or to correct a previously formed spherical or aspherical geodesic lens. The film may also be tailored to serve as a waveguide for these devices. Interfacing or coupling of detector arrays to the thin film waveguides is also facilitated by this index of refraction tailoring process.

DETAILED DESCRIPTION OF THE INVENTION

The present invention provides a necessary means of forming aberration-corrected lenses for integrated optics devices such as spectrum analyzers or the like. The present lens formation technique can either eliminate the need for deformations made by grinding lens depressions in a substrate or forming protrusions on it or it can be used to correct aberrations and imperfections in a lens which has been so formed. The chalcogenide glass film used on the substrate acts as a waveguide, thus eliminating the need to diffuse, e.g., Ti, into the substrate surfaces to make waveguides.

Figure 1:
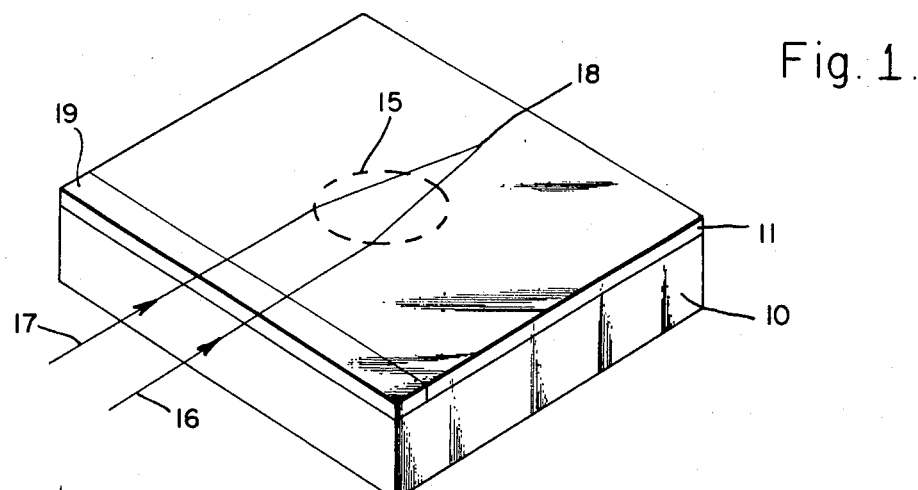
FIG. 1 is a perspective view of a thin film lens formed in accordance with the present invention.

In FIG. 1 there is shown, by way of example, a substrate 10 which may comprise an electro-optic or acousto-optic material such as lithium niobate ($LiNbO_3$) on which there has been deposited a thin film 11 of a chalcogenide glass, the index of refraction of which is sensitive to visible or ultra-violet radiation. The index of refraction of the chalcogenide glass is high, which permits forming the optical waveguide directly on the surface. The high index of refraction is important for practical implementation because modulation of light by electro-optic and acousto-optic effects is, in general, most efficiently performed in high index materials such as $LiNbO_3$, $LiTaO_3$ and $BaTiO_3$. In fact, the figure of merit of both electro-optic and acousto-optic materials depends on the index of refraction cubed. Thus, a waveguide layer with a higher index, as provided by the chalcogenide glass, is very valuable for actual implementation.

Reference to "The Condensed Chemical Dictionary" by Arthur and Elizabeth Rose published by Reinhold Publishing Corporation of New York in 1976 indicates at page 201 that the chalcogens are "the chemically related elements, from Group VI of the periodic table: oxygen, sulfur, selenium, tellurium and polonium." The binary compounds such as oxides, sulfides, etc., are referred to as "chalcogenides". Materials which have been experimentally determined to be suitable for use in the present invention are $Ge_{25}Se_{75}$, $As_2S_3$ and $As_2Se_3$.

At the input end of the device which is intended to receive infrared signal, there is preferably formed a narrow strip 19 of IRTRAN-6 (CdTe) or any other material which is transparent to infrared but opaque to visible or ultra-violet radiation. Once the device has been formed as explained below, it is either provided with a blackened surface or enclosed in any suitable light tight case or seal (not shown) to prevent accidental change of its optical properties. The strip 19 serves as a dichroic input port for an infrared signal. A similar output port may be provided if needed. But in the device of FIG. 5, for example, the input port is used but the output signal is the electrical output of detector array 49 and thus no output port is needed. Of course, it will be understood that the device is fabricated in an optical darkroom.

After the film 11 has been deposited on the substrate 10, it is positioned under a disc 12 which is opaque except for a programmable iris 13 at the center of the disc. The diameter of the iris is variable as a function of time under automatic or predetermined control of any suitable type. A lamp 14, for example, mercury, is positioned above the disc to irradiate the film 11 through the variable size aperture 13.

Figure 3:
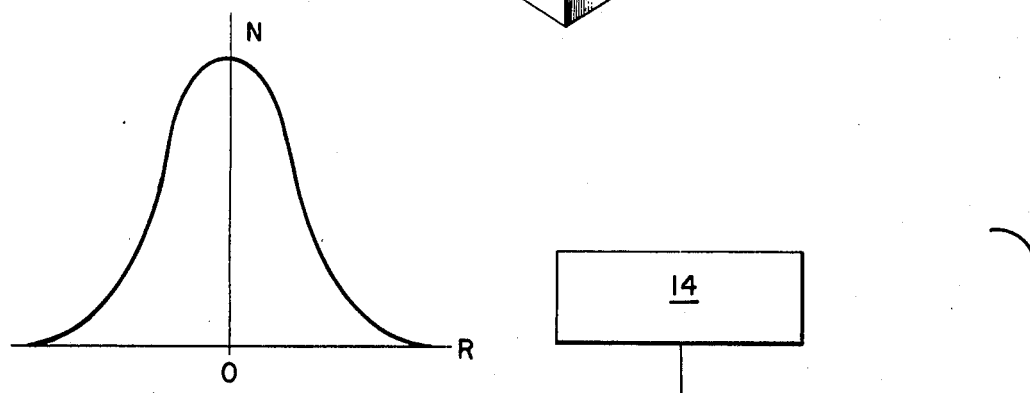
FIG. 3 is a chart graphically illustrating the radial index of refraction profile of the lens of FIG. 1.
Figure 3:
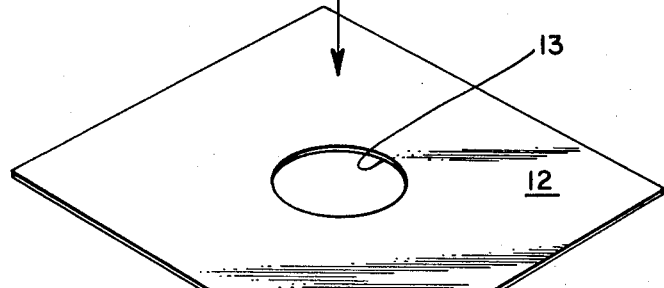
Figure 2:
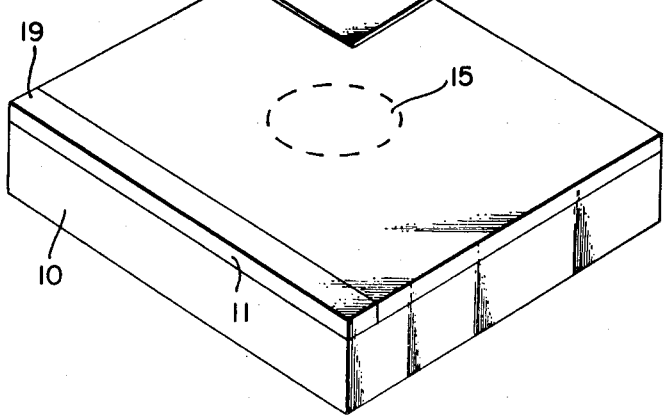
FIG. 2 is an exploded partially diagrammatic view illustrating the method of fabrication of the lens of FIG. 1.

Since the change in the index of refraction of the chalcogenide film is a function of the total flux of radiant energy from the mercury lamp which is incident on it over a period of time, starting with a small diameter iris which increases in diameter gradually over a period of time will produce a radial index of refraction profile of the type shown, by way of example, graphically in FIG. 3. That is to say, in FIG. 3 the vertical axis N measures the index of refraction from 0 and the horizontal axis R measures the radial distance from the center taken as 0 of the programmable iris 13 which will become the center of lens 15 formed in thin film 11. Since the central portion is exposed throughout the entire time of exposure whereas the radial extremities are exposed only after the iris has been enlarged, there will be a greater change in the index of refraction at the center of the round lens area 15 than at its periphery. This change in index of refraction gives rise to a lens action which converges the rays 16 and 17 being transmitted through the thin film 11 to lens 15 so that they are focused to a point 18 in the film, thus providing lens action. Of course, it will be understood that other varying profiles can be formed to produced other desired optical characteristics. Once formed, the device may, as noted above, be provided with a darkened surface coating or may be enclosed in any suitable light tight case or seal.

It will be noted that in the device of FIG. 1, the lens 15 is formed on a flat surface of the substrate 10 by changes of index of refraction in the flat thin film 11. It has previously been known in the art to form geodesic lenses in integrated optics substrates by grinding depressions. Such lenses, however, have consistently been left with considerable aberration so that incoming rays are not brought to a clean focus at a single point.

In some applications it may be more desirable to use the chalcogenide film as a means of correcting for these aberrations rather than as a means of forming the entire lens. Such an arrangement is shown in FIG. 4.

Figure 4:
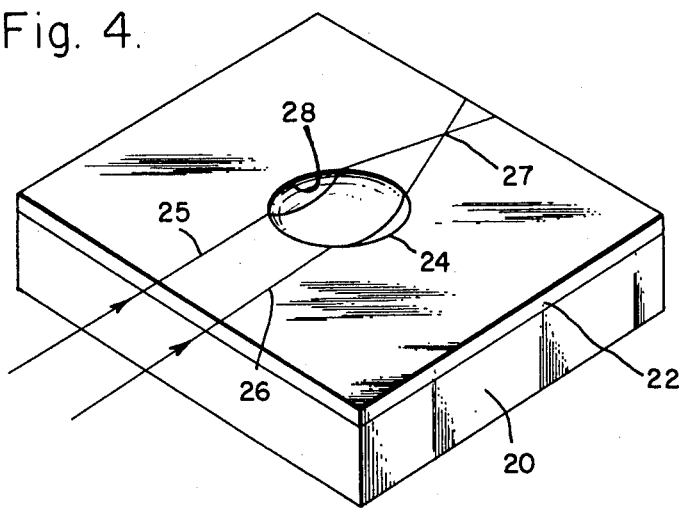
FIG. 4 is a perspective view of a second embodiment of geodesic lens.

In FIG. 4 there is shown a substrate 20 (which may also be formed of an electro-optic or acousto-optic material such as lithium niobate) in which a depression such as a spherical or, preferably, an aspherical indentation 24 has been formed. There is deposited on this substrate a thin film 22 of uniform thickness of a chalcogenide glass as described above. Again, the glass in the lens area is exposed to radiation from a mercury lamp or other suitable source emitting radiation in the visible to ultra-violet portion of the spectrum, and the lens properties are thereby tailored to eliminate aberration from the lens action resulting from the combined function of the depression and the variable index of refraction in the thin film. The result is that a beam of light bounded, for example, by rays 25 and 26 as shown in FIG. 4 after passing through the lens 28 is brought to a focus at point 27. In the devices of FIGS. 1 and 4, the changes in index of refraction which may be induced in the chalcogenide glasses vary from 0.001 to 0.1. With this change in magnitude of the index of refraction, one may either form aberration-free thin film lenses directly in the film or one may correct for aberrations in lenses formed by grinding depressions in a substrate.

These techniques and devices are applicable to apparatus for performing coherent optical signal processing, development of which has been stimulated by the potential for parallel, large information handling capabilities. Processing tasks such as matrix multiplication, Fourier transformation and convolutions are readily performed by resorting to optical processing. All existing optical processors are two-dimensional. They are constructed using three-dimensional bulk optics utilizing lenses, two-dimensional modulators, planar optically sensitive materials and detector arrays. The advent of integrated optics and guided optical wave devices presents the opportunity to develop one-dimensional optic processors. The advantages of rugged and compact optical design, low electrical drive and the utilization of batch fabrication processing, making this approach very attractive. This is most certainly true in the performance of optical Fourier transformations for RF spectrum shalysis. The loss in time-bandwidth products caused by a one-dimensional processing approach is not a problem when "real time" RF spectrum analysis is being considered.

Figure 5:
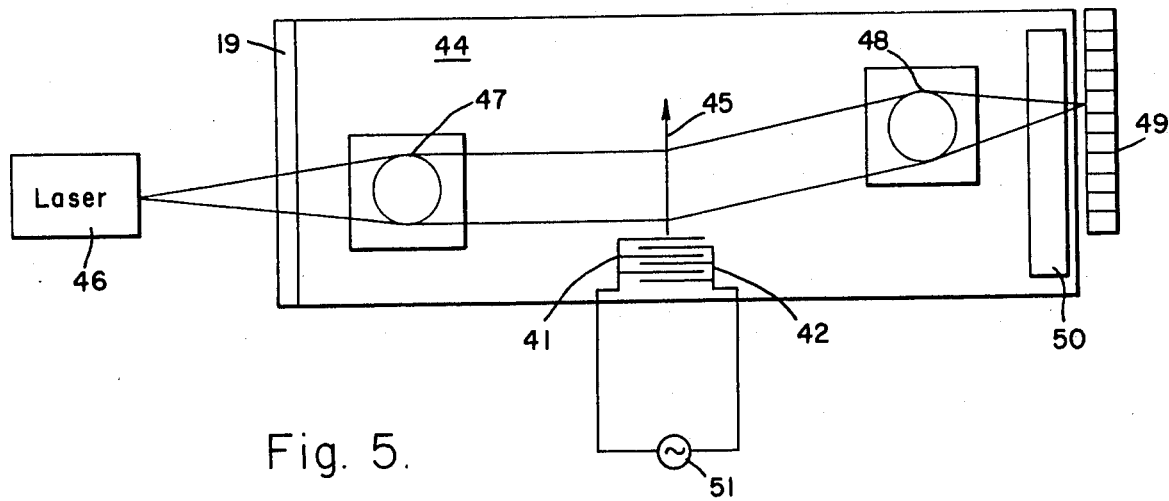
FIG. 5 is a diagrammatic plan view of an integrated optic spectrum analyzer fabricated in accordance with the present invention.
Figure 6:
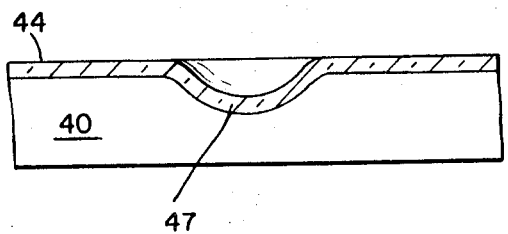
FIG. 6 is a schematic sectional view through one of the geodesic lenses in the device of FIG. 5.

In FIGS. 5 and 6 there is shown, by way of illustration of the application of these techniques and devices, a basic diagrammatic view of an integrated optic spectrum analyzer of the general type discussed in the above-referenced paper by Barnoski et al but fabricated in accordance with the teaching of the present invention. This device relies on thin film lenses, linear detector arrays and planar optical waveguides to perform one-dimensional Fourier transformation of surface acoustic waves. The optical signal is modified by the RF input which is to be analyzed and by surface acoustic waveguided optical wave interactions. The basic layout of an integrated optic spectrum analyzer is shown in FIG. 5. An incoming radar signal is conventionally mixed with a local oscillator such that the IF is within the analyzer bandpass. After amplification, the signal 51 is applied to the surface acoustic wave transducers 41, 42 on the substrate 40 of the device. As in the previous devices, this substrate 40 may consist of lithium niobate ($LiNbO_3$) or other electro-optic or acousto-optic material on which input port 19 is formed and a thin film of a chalcogenide glass such as $As_2S_3$ has been deposited to form a waveguide layer 44. The surface acoustic wave transducer consists of a pair of interdigital finger metallic electrodes 41, 42 deposited on the waveguide 44. Application of the processed RF signal 51 to them generates an acoustic wave which is propagated in the direction of the arrow 45 transversely to an optical beam which is emitted from infrared semiconductor laser 46 and then collimated by integrated optics lens 47 after being propagated through the waveguide 44. After interaction with the acoustic wave at location 45, the modified beam is focused by lens 48 on a detector array 49 after having passed through a region 50 of photo-induced refractive index for depth of field adjustments for coupling to the linear detector array 49. As seen, by way of example, in FIG. 6 the lens 47 may be formed in the system substrate in the same manner that the lens of FIG. 4 was fabricated, that is, by ultra-violet exposure of the chalcogenide glass film deposited on an aspherically ground aperture to adjust the index of refraction thereof to eliminate aberrations. Lens 48 may be similarly formed although it, of course, has a different optical design. Coupler 50 is a rectangular section having an index of refraction profile which varies primarily along its length. It has its maximum value at the center and is lower as one approaches the ends. It thus serves to effectively increase the focal length of lens 48 as the beam is deflected to be focused at the extremities rather than at the center of the linear detector array 49.

As the surface acoustic waves generated by the RF signal 51 traverse the optical waveguide, they produce a periodic perturbation of the waveguide modes' effective refractive index. When the collimated guided optical beam intersects with the acoustic beam at the Bragg angle, a portion of the beam will be diffracted or reflected at an angle which is closely proportional to the acoustic frequency. The diffracted light then passes through an optical waveguide lens such as 48. The intensity distribution in the waveguide lens' focal plane represents the power spectrum of the input RF signal 51.

Although integrated optics spectrum analyzers have been known in the prior art (as seen in the above-referenced Barnoski paper), the present invention permits a degree of freedom heretofore unobtained in thin film optical waveguides for use in such devices. As noted above, the invention utilizes optical waveguide medium transparent chalcogenide glasses which change index of refraction upon irradiation with visible to ultra-violet radiation. Further, since the substrate materials are high index of refraction, the chalcogenide films serve as the only useful material for the purposes of both waveguide formation and index of refraction tuning. This is in contrast to prior art using low index of refraction substrates and materials not capable of tuning the index of refraction subsequent to lens formation. The waveguide losses, however, at the 0.9 to 1.0 micrometer region of the laser input radiation are not increased as a result of the irradiation. Index of refraction profiling for geodesic lens correction and device formation is thus possible. The application of these chalcogenide films to an integrated optic spectrum analyzer represents an important advantage because the various components of the analyzer such as the waveguide film, the geodesic lens, and the coupler or interface with detector arrays may be fabricated with relaxed mechanical tolerances in that the optical beam paths can be varied by the photo-refractive process. Furthermore, the tailoring of the index of refraction profile which is necessary to optimize the coupling of the focused spot onto a detector array (which should be linear for easy fabrication), which tailoring is necessary to limit cross-talk between channels in the coupling between the array and the thin film waveguide, can be most readily achieved by the use of a photo-refractive adjusted thin film of chalcogenide glass.

What is claimed is:
1. An integrated optical device including:
   (a) a substrate having a deformation in a surface thereof; and
   (b) a thin film on said surface of said substrate, said thin film comprising a chalcogenide glass, the region of said film in proximity to said deformation having a predetermined varying index of refraction profile, the combination of said deformation and said varying index of refraction profile providing an aberration-free optical element in said thin film, said profile having been determined by successive exposure of portions of said region to controlled amounts of radiation to produce corresponding changes in the index of refraction of said glass within said region.
2. The integrated optical device of claim 1 wherein said optical element is a geodesic lens and said index of refraction profile varies radially from the center of said deformation.
3. The integrated optical device of claim 1 wherein said deformation is an aspherically shaped depression.
4. The integrated optical device of claim 1 wherein said chalcogenide glass is selected from the group consisting of $Ge_{25}Se_{75}$, $As_2S_3$ and $As_2Se_3$.
5. The integrated optical device of claim 1 wherein said substrate comprises an electro-optic or an acousto-optic material.
6. The integrated optical device of claim 5 wherein said substrate comprises lithium niobate.
7. An integrated optic spectrum analyzer comprising:
   (a) a substrate having a first and a second deformation on a surface thereof;
   (b) a waveguiding layer on said surface of said substrate;
   (c) means for introducing a beam of optical radiation into said waveguiding layer;
   (d) means, in said waveguiding layer in the region of said first deformation, for collimating said beam;
   (e) at least one surface acoustic wave-transducer on the surface of said waveguiding layer for generating an acoustic wave in said waveguiding layer transverse to said collimated beam to thereby interact with said beam;
   (f) means for introducing RF signal to said at least one transducer;
   (g) means, in said waveguiding layer in the region of said second deformation, for focusing said beam subsequent to its interaction with said acoustic wave;
   (h) a detector; and
   (i) means for introducing said focused beam to said detector,
characterized in that (a) said waveguiding layer comprises a chalcogenide glass and (b) said collimating and said focusing means each comprise a region in said chalcogenide glass layer having a respective predetermined varying index of refraction profile, said profile having been predetermined by successively exposing portions of said region to controlled amounts of radiation to produce corresponding changes in the index of refraction of said glass, thereby forming an aberration-free geodesic lens.
8. The analyzer of claim 7 wherein said chalcogenide glass is selected from the group consisting of $Ge_{25}Se_{75}$, $As_2S_3$ and $As_2Se_3$.

9. The analyzer of claim 7 wherein said geodesic lens has a radially varying index of refraction profile.

10. The analyzer of claim 7 wherein said deformation is an aspherically shaped depression.

11. The analyzer of claim 7 wherein said means for introducing said focused beam to said detector includes an optical coupler formed in said waveguiding layer of chalcogenide glass and having an index of refraction profile which varies along the length thereof in a predetermined profile.

12. The analyzer of claim 7 wherein said substrate comprises an electro-optic or acousto-optic material.

13. The analyzer of claim 12 wherein said substrate comprises lithium niobate.

14. A process for fabricating an integrated optical device including the steps of:
   (a) providing a substrate having a deformation in a surface thereof;
   (b) forming a thin film of a chalcogenide glass on said substrate; and
   (c) successively exposing preselected portions of a region of said thin film in proximity to said deformation to radiation of predetermined quantity to vary the index of refraction of said film to form an aberration-free optical element.

15. The process of claim 14 wherein said chalcogenide glass is selected from the group consisting of $Ge_{25}Se_{75}$, $As_2S_3$ and $As_2Se_3$.

16. The process of claim 14 wherein said optical element is a geodesic lens and said index of refraction varies radially.

17. The process of claim 16 wherein said deformation is an aspherically shaped depression.

18. The process of claim 14 wherein said substrate comprises an electro-optic or acousto-optic material.

19. The process of claim 18 wherein said substrate comprises lithium niobate.

* * * * *